Dec. 2, 1958 D. N. MacDONALD 2,862,715

TAPE GUIDING SYSTEM

Filed Aug. 15, 1955

INVENTOR.
DUNCAN N. MAC DONALD

BY

Christie, Parker & Hale
ATTORNEYS

United States Patent Office 2,862,715

Patented Dec. 2, 1958

2,862,715

TAPE GUIDING SYSTEM

Duncan N. MacDonald, Arcadia, Calif., assignor, by mesne assignments, to Burroughs Corporation, Detroit, Mich., a corporation of Michigan Application August 15, 1955, Serial No. 528,498

1 Claim. (Cl. 274—11)

Figure 1:
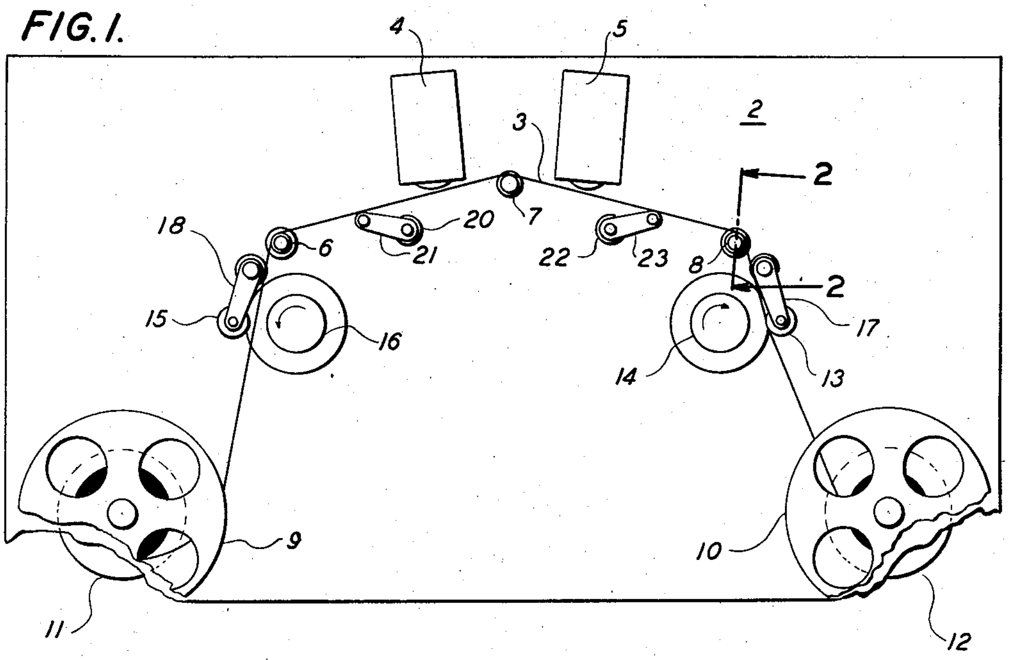

This invention relates to apparatus for transporting and guiding a strip of material through an operational zone, and more particularly, to improved apparatus for transporting a record tape through an operational zone in accurate alignment with a transducer.

In information storage systems it is well known to record information in a plurality of tracks extending along a record tape. For example, in magnetic recording systems, it is well known to position a plurality of transducers transversely of a magnetizable tape in such a way that the tape may be recorded along a plurality of separate tracks or channels. Where the tape is relatively wide and the tracks are spaced apart, the problem of aligning the tape with the transducer during transport is not unduly difficult. However, recently, magnetic recording systems have been developed in which several parallel tracks may be separately recorded very close to one another. By the use of the new recording techniques there is an increase in the so-called packing density, i. e. the number of discrete pieces of information which can be recorded and removed from a given area on the record tape.

It will be appreciated that where a plurality of separate information tracks are recorded in relatively close spatial relationship, it is necessary for the tape to be accurately aligned with respect to the transducer during recording and playback. It has been found that merely running the tape through a channeled guide pin does not provide satisfactory alignment, inasmuch as a certain amount of play must be allowed the tape in the channel to allow the tape to slip through the channel, as well as to allow for variation in the tape width.

One proposed solution to the problem is a split guide pin which is divided in two parts with one part being slightly spring loaded to urge the tape against a reference shoulder on the other part. Although the use of split guide pins provides a satisfactory alignment of the tape with the transducer, it has been found that the adjustment of the spring load is very critical. If the spring loading is too severe, the tape will tend to buckle and the friction of the edge of the tape against the reference shoulder causes an undue amount of wear. On the other hand, if the spring loading is not sufficient, the tape is able to move transversely, which results in a lack of proper alignment of the tracks with the recording head.

In accordance with my invention I provide a new and improved tape transporting and guiding system in which the tape is passed over at least one guide pin having a tapered section which terminates at its small end in a fixed shoulder. When the tape is drawn across the tapered guide pins, a small transverse force is generated which maintains one edge of the tape in contact with the fixed shoulder, thereby establishing a reference so that during transport the tape is maintained in accurate alignment with the transducer.

By means of my invention, a tape transport system is provided in which a tape is accurately aligned with a transducer in spite of substantial variation in tape width and in which no adjustment is required after the initial selection of a proper degree of taper for the guide pins.

Figure 2:
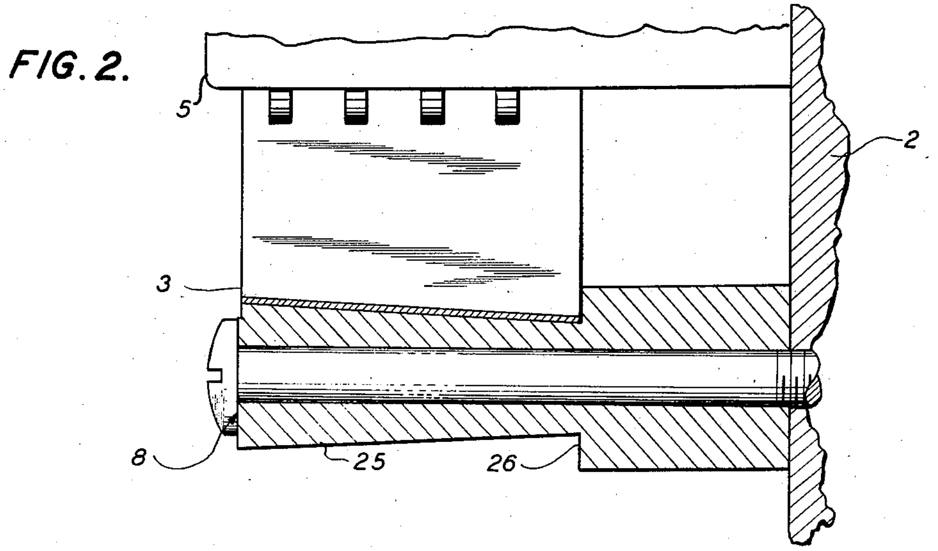

A better understanding of my invention may be had by a reading of the following detailed description in connection with the drawings in which:

Fig. 1 is an elevational view, partly broken away, of a tape transport system including an illustrative embodiment of my invention; and Fig. 2 is a sectional view of the apparatus of Fig. 1 taken along the reference line 2—2.

The tape transport system of Figs. 1 and 2 is adapted to pass a magnetizable tape 3 through an operational zone in which there is located a pair of magnetic recording heads 4 and 5 which are mounted on a frame 2. Each of the magnetic recording heads 4 and 5 includes a plurality of transducers which are adapted to magnetize the tape 3 in accordance with electrical information signals. By means of the transducers of the magnetic recording heads 4 and 5, a plurality of adjacent tracks on the tape 3 may be individually recorded. In order to increase the amount of information which may be recorded on the tape 3, the transducers of the magnetic recording heads 4 and 5 are arranged to record and read from tracks on the tape 3 which are interleaved. Thus, with respect to the tracks on the tape 3, the magnetic recording head 4 records every other track, while the magnetic recording head 5 records the tracks located between those which are recorded by the magnetic recording head 4.

The tape 3 is guided through the operational zone by means of the tapered guide pins 6, 7 and 8 mounted on the frame 2. The ends of the tape 3 are stored in a pair of reels 9 and 10 which are individually driven in conventional fashion by means of the reversible reel drive motors 11 and 12.

The direction of tape transport is determined by means of a pair of idler rollers 13 and 15 which are journalled in the actuating arms 17 and 18 respectively. The actuating arms 17 and 18 are pivotally mounted on the frame 2 and are adapted to engage the idler rollers selectively with the capstans 14 and 16. When the idler roller 13 is engaged with the capstan 14, the tape 3 is driven from the reel 9 through the operational zone to the reel 10. In like manner, when the idler roller 15 is engaged with a capstan 16, the tape 3 is driven from the reel 10 to the reel 9. The capstans 14 and 16 may be rotatably driven in opposite directions from a suitable motor (not shown) mounted on the rear of the frame 2.

When it is desired to record or read from the tracks on the tape 3 with which the transducers of the magnetic recording head are associated, the tape 3 may be elevated into contact with the pole pieces of the recording head 4 by means of an idler roller 20 which is journalled in a lift arm 21. In like manner, when it is desired to record on the tracks associated with the transducers of the magnetic recording head 5, the tape 3 may be elevated into contact with the pole pieces of the magnetic recording head 5 by means of an idler roller 22 which is journalled in a lift arm 23.

For automatic operation, the actuating arms 17 and 18 and the lift arms 21 and 23 may be positioned by means of solenoids which are energized via electronic or manual switching circuits.

In order that the tape 3 may be accurately aligned with the magnetic recording heads 4 and 5 during transport, each of the guide pins 6, 7 and 8 is provided with a tapered or frusto-conical portion 25 (Fig. 2) which terminates in a reference shoulder 26. As the tape 3 is drawn across the portions of the guide pins 6, 7 and 8, there is generated a transverse force component which urges the tape into engagement with the reference shoulders of the guide pins 6, 7 and 8. Thus, the tracks recorded on the tape 3 are accurately positioned with respect to the edge of the tape, and since the edge is accurately positioned with respect to the magnetic recording heads 4 and 5, the tracks are likewise accurately aligned with the recording heads.

By way of example, a taper of the order of twenty minutes, i. e. one-third of a degree, is satisfactory where the tape is approximately three-fourths of an inch and is transported at the rate of sixty inches per second.

I claim:

In a tape transport system, the combination of a frame; a central guide pin mounted on the frame; at least one guide pin mounted on each side of and below the central guide pin, said guide pins being adapted to cooperate to define a traverse for a tape, each of said guide pins having a fixed shoulder and a frusto-conical portion joining said shoulder; a first multiple track transducer mounted on the frame on one side of the central guide pin adjacent the traverse; a second multiple track transducer mounted on the frame on the other side of the central guide pin adjacent the traverse, the first and second transducers being arranged so that the tracks are interlaced on the tape; a first rotatable capstan located at a point along the tape traverse to one side of the three guide pins; a first pinch roller adapted to engage the tape with a first capstan whereby the tape is drawn over the three frusto-conical portions of the guide pins in a forward direction in engagement with the shoulders; a second rotatable capstan located along the tape traverse at a point on the other side of the three guide pins along the tape traverse; a second pinch roller adapted to engage the tape with the second capstan whereby the tape is drawn over the frusto-conical portions of the three guide pins in a reverse direction in engagement with the shoulders; a first lift arm mounted on the frame adjacent the traverse of the tape; a first idler roller journalled in the first lift arm for engaging the tape with the first transducer; a second lift arm mounted on the frame adjacent the traverse of the tape; and a second idler roller journalled on the second lift arm for engaging the tape with the second transducer.

References Cited in the file of this patent

UNITED STATES PATENTS

| | | |
|---|---|---|
| 2,235,029 | Levinson | Mar. 18, 1941 |
| 2,442,400 | Collins | June 1, 1948 |
| 2,631,855 | Kornei | Mar. 17, 1953 |
| 2,714,512 | Reed | Aug. 2, 1955 |